(12) United States Patent
Rivas Constante

(10) Patent No.: US 10,996,755 B2
(45) Date of Patent: May 4, 2021

(54) PIEZOELECTRIC HAPTIC FEEDBACK MODULE

(71) Applicant: Google LLC, Mountain View, CA (US)

(72) Inventor: Diego Rivas Constante, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/908,611

(22) Filed: Feb. 28, 2018

(65) Prior Publication Data

US 2019/0265793 A1 Aug. 29, 2019

(51) Int. Cl.
*G06F 3/01* (2006.01)
*G06F 3/041* (2006.01)
(Continued)

(52) U.S. Cl.
CPC .............. *G06F 3/016* (2013.01); *G06F 3/041* (2013.01); *G06F 3/02* (2013.01); *G06F 3/0338* (2013.01)

(58) Field of Classification Search
CPC . G06F 3/016; G06F 3/041; G06F 3/02; G06F 3/0338
See application file for complete search history.

(56) References Cited

U.S. PATENT DOCUMENTS 8,593,409 B1 11/2013 Heubel et al.
8,610,549 B2 * 12/2013 Modarres ................. G08B 6/00
340/407.2

(Continued)

FOREIGN PATENT DOCUMENTS

CN 105759956 7/2016
EP 3220236 3/2017
TW 201804287 2/2018

OTHER PUBLICATIONS

"Shaping the Future with Novasentis Electro-mechanical Polymers (EMP)," [Brochure] Novasentis (2013), 2 pages.
(Continued)

*Primary Examiner* — Ricardo Osorio
(74) *Attorney, Agent, or Firm* — Fish & Richardson P.C.

(57) ABSTRACT

A device comprising:
  a device housing defining a space for accommodating one or more electronic components, the device housing comprising:
  a first panel bounding the space and having an exterior surface facing away from the space, and
  a second panel bounding the space and including a touch-sensitive display having a display surface facing away from the space, the display surface and the exterior surface being opposite surfaces;
  a haptic feedback module supported by and conforming to at least a portion of the exterior surface, the haptic feedback module comprising a haptic response layer, the haptic response layer comprising a piezoelectric material and electrodes and configured to couple vibrations to a user body member in contact with the haptic feedback module to provide a haptic response to the user during operation of the device; and
  an electronic control module accommodated in the space and coupled to the electrodes of the haptic response layer, the electronic control module being programmed to receive a touch input signal from the touch-sensitive display and provide haptic signals to the electrodes based on the received touch input signal to activate the piezoelectric material of the haptic response layer.

17 Claims, 3 Drawing Sheets

(51) Int. Cl.
*G06F 3/0338* (2013.01)
*G06F 3/02* (2006.01)

(56) References Cited

U.S. PATENT DOCUMENTS

| | | | |
|---|---|---|---|
| 8,730,181 B1 | 5/2014 | Raman et al. | |
| 9,086,855 B2* | 7/2015 | Willis | G06F 3/013 |
| 9,213,434 B2* | 12/2015 | Yliaho | G06F 3/0414 |
| 9,235,299 B2* | 1/2016 | Ady | H03K 17/962 |
| 9,282,407 B2* | 3/2016 | Kim | H04R 3/12 |
| 9,400,525 B2* | 7/2016 | Phipps | G06F 3/03547 |
| 9,557,857 B2* | 1/2017 | Schediwy | G06F 3/016 |
| 9,715,280 B2* | 7/2017 | Ullrich | G09B 21/004 |
| 9,870,053 B2* | 1/2018 | Modarres | G06F 3/041 |
| 9,942,640 B2* | 4/2018 | Suzuki | H04R 1/028 |
| 10,120,447 B2* | 11/2018 | Peshkin | G06F 3/016 |
| 10,126,861 B2* | 11/2018 | Schwartz | G06F 3/0416 |
| 10,409,379 B1* | 9/2019 | Khoshkava | B06B 1/0238 |
| 2009/0160763 A1* | 6/2009 | Cauwels | G06F 3/016 345/156 |
| 2010/0090564 A1* | 4/2010 | Oh | H04M 1/67 310/328 |
| 2010/0225600 A1* | 9/2010 | Dai | G06F 3/0412 345/173 |
| 2010/0277430 A1* | 11/2010 | Cruz-Hernandez | G06F 3/016 345/173 |
| 2011/0018697 A1* | 1/2011 | Birnbaum | A63F 13/10 340/407.2 |
| 2011/0261021 A1* | 10/2011 | Modarres | G06F 3/0412 345/177 |
| 2012/0068957 A1* | 3/2012 | Puskarich | G06F 3/016 345/174 |
| 2013/0120323 A1* | 5/2013 | Scharff | G06F 3/043 345/177 |
| 2014/0183269 A1* | 7/2014 | Glaser | G06F 21/35 235/492 |
| 2014/0354570 A1* | 12/2014 | Makinen | G06F 3/041 345/173 |
| 2015/0042590 A1* | 2/2015 | Ando | G06F 3/0354 345/173 |
| 2015/0102947 A1 | 4/2015 | Chung et al. | |
| 2015/0257210 A1* | 9/2015 | Miles | H05B 33/02 313/512 |
| 2016/0127836 A1* | 5/2016 | Zaitsu | H04R 7/045 455/550.1 |
| 2017/0083096 A1* | 3/2017 | Rihn | G06F 3/016 |
| 2017/0090654 A1* | 3/2017 | Silvanto | G06F 3/0238 |
| 2017/0153703 A1 | 6/2017 | Yun et al. | |
| 2017/0357325 A1* | 12/2017 | Yang | G06F 3/016 |
| 2018/0218859 A1* | 8/2018 | Ligtenberg | H03K 17/9647 |
| 2018/0329494 A1* | 11/2018 | Hernandez Santisteban | G06F 3/016 |
| 2019/0073079 A1* | 3/2019 | Xu | G06F 3/0416 |
| 2019/0250752 A1* | 8/2019 | Shim | G06F 3/016 |

OTHER PUBLICATIONS

PCT International Search Report and Written Opinion in International Appln. No. PCT/US2019/014468, dated Apr. 8, 2019, 14 pages.

TW Office Action in Taiwan Appln. No. 108104095, dated Dec. 16, 2019, 13 pages (with machine translation).

PCT International Preliminary Report on Patentability in International Appln. No. PCT/US2019/014468, dated Sep. 10, 2020, 9 pages.

* cited by examiner

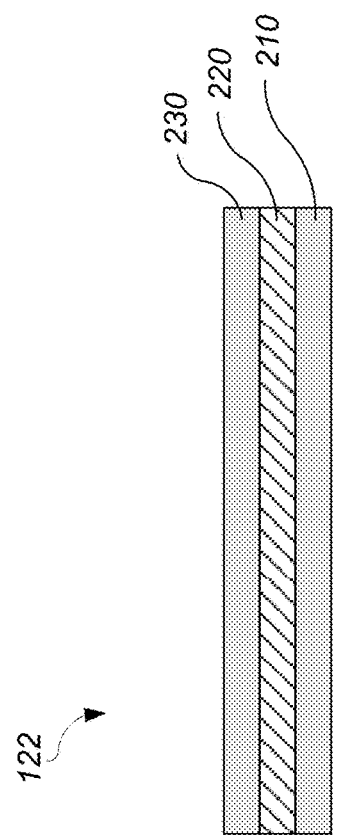
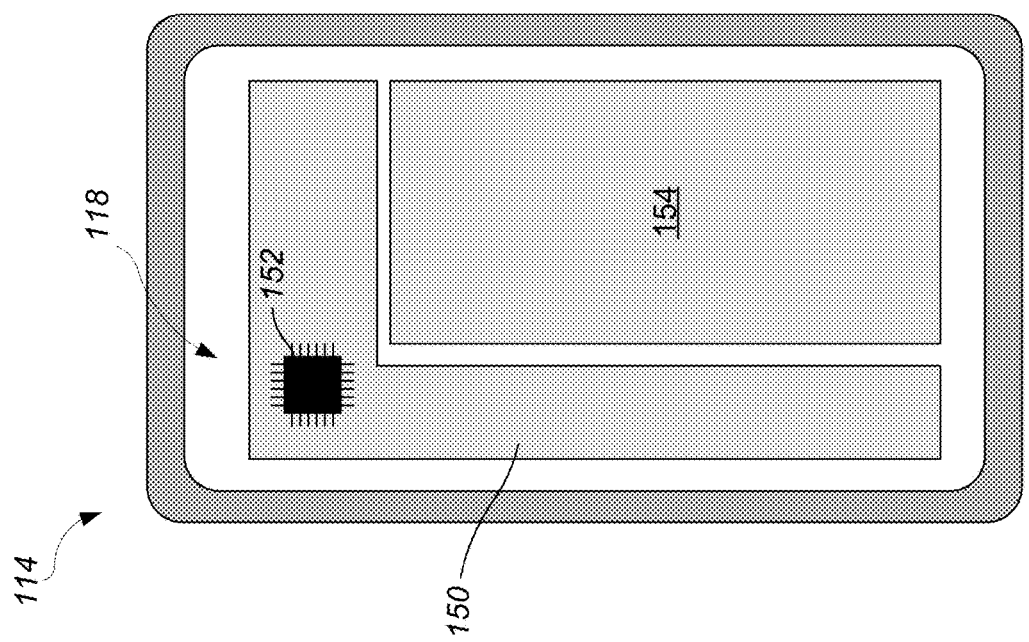
FIG. 2
FIG. 1C

PIEZOELECTRIC HAPTIC FEEDBACK MODULE

TECHNICAL FIELD

This disclosure generally relates to haptic feedback devices.

BACKGROUND

In general, haptic feedback mechanisms can be used to provide tactile feedback to a user of a device to enhance user experience. Vibration is an example of haptic feedback mechanism. Vibration can be produced by an acceleration or deceleration of a moving mass, such as through an eccentric rotating mass that is attached to a motor. Vibration can also be produced using piezoelectric materials by applying a time varying voltage to a piezoelectric material. Devices capable of generating haptic responses are referred to as haptic feedback modules. Various consumer electronic devices such as smartphones or gaming controllers contain haptic feedback modules to provide tactile feedback in response to a user input. A haptic feedback module is typically attached to a housing of the device and transfers the generated vibration through the housing to the user.

SUMMARY

This disclosure features haptic feedback modules integrated on exterior surfaces of electronic devices. By placing the haptic feedback module on the exterior surface of the device, haptic response can be directly provided to, for example, the fingertips or the palm of the user without propagating through the housing of the device.

In general, in a first aspect, a device includes a device housing defining a space for accommodating one or more electronic components, the device housing including a first panel having a first surface facing away from the space; a haptic response layer supported by and conforming to at least a portion of the first surface, the haptic response layer including a piezoelectric material and electrodes and configured to couple vibrations to a user to provide a haptic response to the user during operation of the device; and an electronic control module accommodated in the space and coupled to the electrodes of the haptic response layer, the electronic control module being programmed to provide haptic signals to the electrodes to activate the piezoelectric material in the haptic response layer.

Embodiments of the device can include one or more of the following features. For example, the haptic response layer can extend over a first area of the first surface, the first area of the first surface being greater than 50% of a total area of the first surface. The haptic response layer can include a first interior opening. The haptic response layer can have a thickness less than 500 µm. The haptic response layer can be configured to generate a first localized haptic response on a first portion of the haptic response layer and a second localized haptic response on a second portion of the haptic response layer different from the first portion.

The piezoelectric material can include a piezoelectric polymer.

The first panel can include a glass material.

In some embodiments, the device can further include an adhesive layer arranged between the first surface of the first panel and the haptic response layer and configured to adhere the haptic response layer to the first surface. The adhesive layer can be adjacent to both the first surface of the first panel and the haptic response layer. The first surface and the haptic response layer can be bonded to the adhesive layer through an autoclave process.

In some embodiments, the device can further include a coating layer supported by the haptic response layer. The coating layer can be adhered to the haptic response layer by molecular adhesion. The coating layer can be configured to visually obscure the haptic response layer. The coating layer can be configured to provide a first texture different from a second texture of the haptic response layer.

In some embodiments, the device housing can further include a touch-sensitive display having a display surface facing away from the space, and the electronic control module is further programmed to receive a touch input signal from the touch-sensitive display and provide the haptic signals to the electrodes based on the received touch input signal, wherein the touch-sensitive display and the first panel enclose the space defined by the device housing.

In some embodiments, the first panel can include a touch-sensitive layer configured to receive a touch input from the first surface and generate a touch input signal, and the electronic control module is further programmed to receive the touch input signal from the touch-sensitive layer and to provide the haptic signals to the electrodes based on the received touch input signal.

In some embodiments, the first surface can be a curved surface. The device can further include one or more buttons; and one or more directional input sticks configured to receive directional input from the user.

Among other advantages, implementations of the piezoelectric haptic feedback module described herein may improve the performance of haptic feedback generation. For example, direct transfer of the haptic response onto the user can improve power efficiency of the haptic feedback module. Elimination of a dedicated moving mass may lead to a reduction in noise generation and in total mass of the device. The removal of the haptic module from the inside of the device and arranging it on the exterior surface of the device may enable reduction in size or thickness of the device. Localized haptic response may be provided at different locations of the surface of the device. Reliability and yield of the haptic feedback module may be increased. Frequency response of the haptic feedback module may be improved.

The details of one or more implementations of the subject matter of this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 1C shows a front view of a frame of a device housing having a space;

FIG. 2 shows a cross-sectional view of a haptic response layer;

DETAILED DESCRIPTION

Figure 1B:
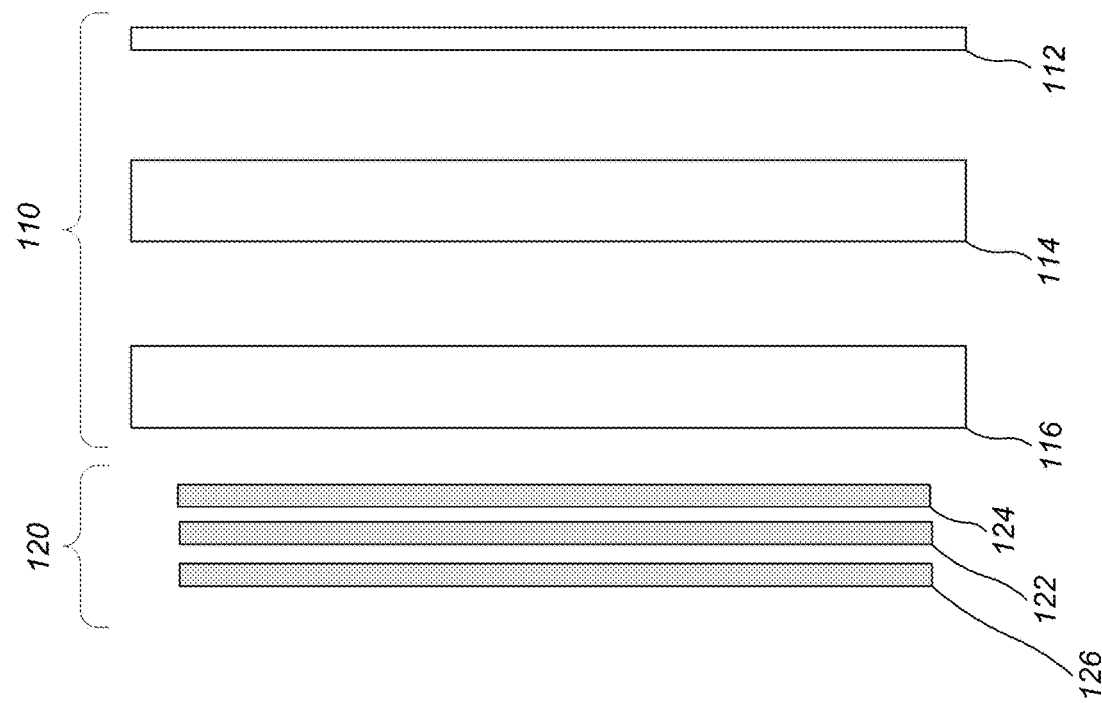
FIG. 1B shows an exploded view of the mobile with an exterior piezoelectric haptic feedback module shown in FIG. 1A.
Figure 1A:
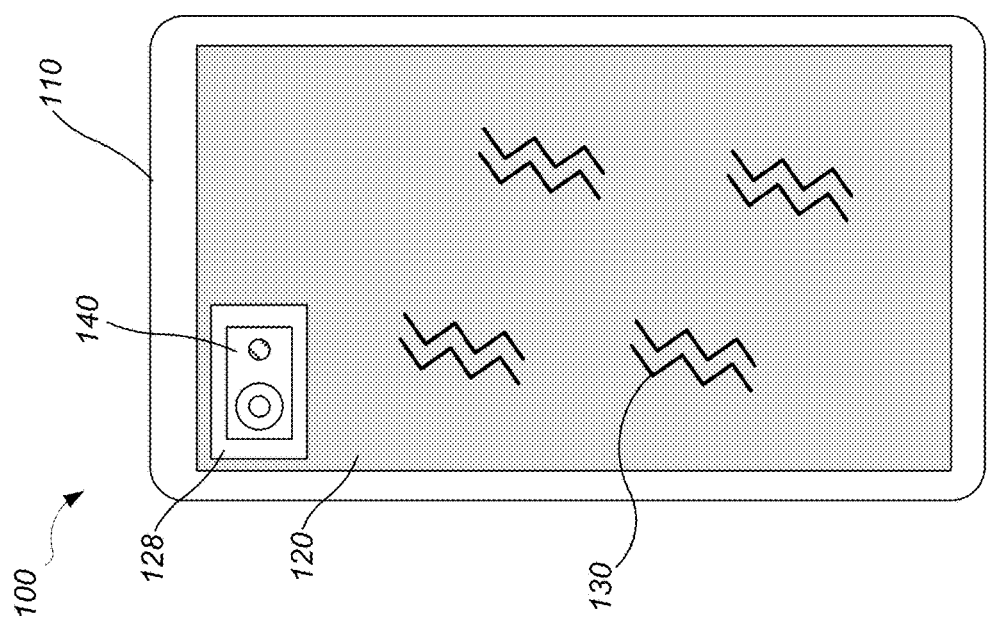
FIG. 1A shows a rear view of a mobile terminal with an exterior piezoelectric haptic feedback module.

Referring to FIG. 1A and FIG. 1B, an exemplary mobile terminal 100 with an exterior piezoelectric haptic feedback module is shown in rear view and exploded view, respectively. The mobile terminal 100 includes a device housing 110, a piezoelectric haptic feedback module 120, and a camera module 140. The device housing 110 includes a display 112, a frame 114, and a rear panel 116. The frame 114 provides a structural basis for the mobile terminal on to which the display 112 and the rear panel 116 are attached. The display 112 may be a touch-sensitive display. The rear panel 116 may be formed from various materials such as metal, glass, or plastic. The side of the mobile terminal 100 from which the display 112 is visible may be referred to as the front side, and the side of the mobile terminal 100 from which the rear panel 116 is visible may be referred to as the rear side of the mobile terminal 100.

The piezoelectric haptic feedback module 120 includes a haptic response layer 122, an adhesive layer 124, a coating layer 126, and an opening 128. The piezoelectric haptic feedback module 120 is configured to generate a haptic response 130. Haptic response is a type of response that can be perceived by a user of a device through the user's sense of touch. Examples of a haptic response include vibration, modulation of surface friction, applications of force, and movement. A vibration received in response to application of a touch input on the mobile terminal 100 is an example of haptic response. Vibration-type haptic response may be generated in various ways, including use of piezoelectric effect, and acceleration and deceleration of a dedicated mass.

Referring to FIG. 1C, a front view of the frame 114 of the device housing 110 having a space is shown. The device housing 110 defines a space 118 for accommodating various electronic components of the mobile terminal 100. The space 118 accommodates a printed circuit board assembly (PCBA) 150 and a battery 154. The PCBA 150 includes an electronic control module 152. The electronic control module 152 is electrically coupled to the piezoelectric haptic feedback module 120. The electronic control module 152 is configured to generate a haptic signal for generating haptic response 130 from the piezoelectric haptic feedback module 120. The haptic signal is an electrical signal, such as a voltage or current waveform. The electronic control module 152 may be programmed to receive a touch input from the display 112 and generate the haptic signal based on the received touch input to provide the haptic response 130 to the user.

The piezoelectric haptic feedback module 120 is attached to an exterior surface of the rear panel 116 of the device housing 110 of the mobile terminal 100. The external placement of the piezoelectric haptic feedback module 120 allows the haptic feedback module 120 to come in direct contact with a hand of a user holding the mobile terminal 100. Direct contact between the haptic feedback module 120 and the hand of the user of the mobile terminal 100 allows direct transfer of the haptic response 130 generated by the haptic feedback module 120 to the user without being transferred through an intermediate structure. Direct transfer of the haptic response 130 may have various advantages.

In general, haptic response 130 can be coupled to the user of the mobile terminal 100 by direct or indirect transfer. Direct transfer of the haptic response 130 may be more efficient relative to an indirect transfer of the haptic response through the device housing 110. For example, in the case when the haptic feedback module 120 is placed in the space 118, such as on an interior surface of the rear panel 116 facing the display 112, the haptic response 130 generated by the haptic feedback module 120 is first transferred to the rear panel 116. Due to the various mechanical characteristics of the rear panel 116 such as its mass or stiffness, the generated haptic response 130 is attenuated by the rear panel 116 before the haptic response is transferred onto the hand of the user. As such, magnitude or the force of the haptic response in the case of the internally-attached haptic feedback module needs to be increased relative to the externally-attached configuration to provide the user with a haptic response of comparable magnitude. Accordingly, direct transfer may allow a reduction in the power consumption, size, and/or complexity of the haptic feedback module 120 due to a decrease in the necessary magnitude of the haptic response to be generated by the haptic feedback module 120.

Direct transfer of the haptic response 130 may allow fine control over the characteristics of the generated haptic response 130. An intermediate transfer structure, such as the device housing 110, has a mechanical stiffness and a mechanical response time that interferes, attenuates, and/or distorts (e.g., through frequency-dependent attenuation) a generated haptic response. Direct transfer of the haptic response reduces or eliminates such interferences, attenuations, and distortions, which may allow haptic responses of high frequency components (e.g., shorter vibration duration), or finer magnitude resolution to be transferred to the user. Further, the low mechanical inertia of the piezoelectric haptic feedback module 120 may further improve generation of haptic responses with high frequency components. Generation of haptic response with finer magnitude resolution and/or high frequency components may allow more degree of freedom in haptic response, which may be used to produce customizable or novel tactile effects, such as texture-like effects.

Direct transfer of the haptic response 130 may reduce variability in transfer efficiency of the haptic response to the user relative to the transfer of the haptic response through the device housing 110. Manufacturing of the various components and the assembly of the mobile terminal 100 have process tolerances, which may affect the transfer efficiency of the haptic response from the haptic feedback module 120 to the user. For example, when the haptic feedback module 120 is placed on the interior surface of the rear panel 116, various factors may affect the transfer efficiency of the haptic response. Examples of the factors include mechanical characteristics of the rear panel 116 and mechanical coupling between the haptic feedback module 120 and interior surface of the rear panel 116, which are subject to variations in manufacturing and assembly processes. Direct transfer of the haptic response through external placement of the haptic feedback module 120 reduces or eliminates such factors that may affect the transfer efficiency of the haptic response, which can improve consistency of haptic response across multiple units of the mobile terminal 100 and thereby improve manufacturing yield.

Specifically, for a conventional moving mass-based actuators, the generated haptic response is initially spatially localized at the actuators, which is then mechanically transferred onto the device housing 110 and distributed such that the haptic response can be transferred to the user through different locations of the mobile terminal 100. Moving mass-based actuators are typically small relative to the mobile terminal 100 (e.g., less than 10% in lateral dimensions), and as a result, the mechanical coupling between such actuators and the device housing 110 is typically concentrated over a small fraction of the surface area of the device housing 110. As such, any variation in the mechanical coupling at the interface may translate into a large variation in the transfer efficiency of the haptic response generated by such actuators. However, the mechanical coupling of the piezoelectric haptic feedback module 120 is distributed over a significantly larger fraction of the surface area of the device housing 110 (e.g., 50% in lateral dimension). Because the mechanical coupling of the haptic feedback module 120 is distributed over a larger surface area compared to moving mass-type actuators, the overall transfer efficiency of the piezoelectric haptic feedback module 120 may be less sensitive to a local variation in the mechanical coupling.

Referring to FIG. 2, a cross-sectional view of the haptic response layer 122 is shown. The haptic response layer 122 includes a first electrode layer 210, a piezoelectric material layer 220, and a second electrode layer 230. Piezoelectric materials belong to a class of materials that generate mechanical strain and/or deformation in response to an application of an electric field. Conversely, piezoelectric materials may also demonstrate generation of electric charges and/or voltage in response to application of mechanical stress. Examples of piezoelectric materials include piezoelectric crystals, piezoelectric ceramics, and electroactive polymers ("piezoelectric polymer").

An electric field can be established within the piezoelectric material layer 220 by applying a voltage across the first electrode layer 210 and the second electrode layer 230. The voltage may be provided by the electronic control module 152 that is coupled to the first and second electrode layers 210 and 230. The established electric field causes the piezoelectric material layer 220 to deform. By applying a time varying voltage waveform across the first and second electrode layers 210 and 230, a time varying deformation of the piezoelectric material layer 220 can be produced. Such time varying deformation produces a vibration, which can be used to provide the haptic response 130 to the user of the mobile terminal 100. The peak to peak amplitude of the time varying voltage waveforms may range, for example, from 10 V to 50 V. In some cases, micron-scale displacement may be produced with a peak to peak amplitude of less than 30 V (e.g., 22 V). In cases of surface friction modulation, a time varying voltage waveform with high frequency components (e.g., >100 Hz) and peak to peak amplitude in the range of, for example, 10 V to 50 V may be used.

The haptic response layer 122 may be configured to provide a localized haptic response. Typically, in the case of indirect-transfer of the haptic response through the device housing 110, the haptic response is a non-local response that can be felt in similar magnitudes across the extent of the mobile terminal 100. However, in the case of direct-transfer through the haptic response layer 122, various portions of the haptic response layer 122 may be separately addressable to allow generation of localized haptic responses. For example, the first and second electrode layers 210 and 230 may include an array of individually addressable electrode pairs configured to apply electric field over a specific portions of the piezoelectric material layer 220. Example of such an electrode array may be a 2D array of rectangular parallel-plate electrodes arrayed throughout the first and second electrode layers 210 and 230. Such local application of electric field may produce a localized haptic response. For example, a specific finger of the user or a specific area of the palm of the user may be targeted using the localized haptic response.

The haptic response layer 122 based on the piezoelectric material layer 220 does not require a dedicated moving mass such as is the case for linear resonant actuators (LRA) or eccentric rotating mass (ERM) actuators. Moving mass-based approaches generate haptic response through rapid acceleration and deceleration of the moving mass. Such rapid actuation typically takes place on a timescale on the order of tens to hundreds of milliseconds, which may require monitoring and feedback control of the moving mass to avoid undesirable spurious vibrations, increasing the complexity of the control circuitry. The haptic response layer 122 instead generates the haptic response through mechanical deformation of the piezoelectric material layer 220, which may be done through application of voltage without feedback control. As such, complexity of the electronic control module 152 may be reduced relative to that of moving mass-based actuators.

The haptic response layer 122 based on the piezoelectric material layer 220 may be made thin and be applied on any surface on which haptic feedback is desired. For example, the thickness of the haptic response layer 122 can range from 100 µm to 500 µm. Thickness of the haptic response layer 122 may affect the external appearance of the mobile terminal 100 as the haptic feedback module 120 is externally attached to the mobile terminal 100. As such, it may be beneficial to minimize the thickness of the haptic response layer 122.

The haptic response layer 122 based on the piezoelectric material layer 220 is typically significantly thinner than LRA or ERM actuators due to the absence of a dedicated moving mass. The magnitude of haptic response generated by the LRA or ERM actuators depend on, among others, the mass of the moving mass. The moving mass occupies a significant volume within such an actuator to provide the required mass. As a result, such an actuator in turn occupies a significant volume within the space 118 of the device housing 110. In contrast, the thinness of the haptic response layer 122 allows the haptic feedback module 120 to be moved out of the space 118 and be attached on the exterior surface of the mobile terminal 100 without significantly affecting the external form factor or appearance of the mobile terminal 100. As such, the amount of space 118 needed to accommodate the electronic components may be reduced, and the size or thickness of the mobile terminal 100 may be reduced.

Referring again to FIG. 2, the first and second electrode layers 210 and 230 may be formed from various electrically conductive materials. For example, the electrode layers may be formed from aluminum, copper, transparent conducting oxide, transparent conducting polymer, graphene, or carbon nanotube. Examples of transparent conducting polymer include Poly(3,4-ethylenedioxythiophene) (PEDOT), PEDOT mixed with polystyrene sulfonate (PEDOT:PSS), and PEDOT-tetramethacrylate (PEDOT-TMA). Examples of transparent conducting oxide include indium tin oxide (ITO) and aluminum-doped zinc oxide (AZO). Forming the electrode layers 210 and 230 from transparent materials may provide the haptic response layer 122 with a transparent appearance by allowing a portion of incident light to pass through the haptic response layer 122. A transparent haptic response layer 122 may allow the rear panel 116 to be visible to the user of the mobile terminal 100, which may enhance the visual consistency of the read side of the mobile terminal 100. The transparent haptic response layer 122 may allow the haptic response layer 122 to be applied on the front side of the mobile terminal 100 on the external surface of the display 112.

While the haptic response layer 122 shown in FIG. 2 includes the first electrode layer 210 and the second electrode layer 230 arranged on opposite sides of the piezoelectric material layer 220, in some implementations, a single electrode layer may be implemented. For example, electrode arrays on a single electrode layer may be used to generate electric fields with components along the plane of the piezoelectric material layer 220. As another example, a conductive (e.g., metallic) rear panel 116 may serve as a common ground electrode, and electric field may be established between the single electrode layer and the rear panel 116.

Referring back to FIG. 1A, the haptic feedback module 120 may be formed into various shapes. Because of the thinness and flexibility of the haptic response layer 122, the haptic feedback module 120 may be formed into desired shapes, such as squares, rectangles, and circles of various sizes. For the same reasons, the haptic feedback module 120 may be molded to conform to various non-planar surfaces. Conforming to a surface may mean, among others, extending over and being in contact with the surface without gaps. As a result, the haptic feedback module 120 may follow the contours of the non-planar surfaces. In some implementations, a conformal layer has a top surface that is substantially the same as the underlying surface to which it conforms. For example, a layer that conforms to a non-planar surface provides a new surface that has substantially the same shape as the underlying non-planar surface supporting the conformal layer.

In some implementations, the haptic feedback module 120 may conform around the edges of the mobile terminal 100 and onto the side surfaces of the device housing 110. Such configuration may enable localized haptic feedback along the side surface of the mobile terminal 100. For example, such localized feedback along the side surface of the mobile terminal 100 may be used to implement "squeeze" effects or "active edge effects" on the mobile terminal 100.

The haptic feedback module 120 may have one or more openings, such as the opening 128. The openings may accommodate various components of the mobile terminal 100 to avoid obstructions, such as physical or optical obstruction, of such components by the haptic feedback module 120. For example, the haptic feedback module 120 may block or otherwise interfere with the transmission of light. The opening 128 allows light to enter the camera module 140 without loss of light or degradation in optical imaging quality. As another example, the haptic feedback module 120 may block capacitive sensing used in, for example, a fingerprint sensor. An opening in the haptic feedback module 120 allows capacitive sensing to be performed without interference by the haptic feedback module 120.

While the mobile terminal 100 shown in FIGS. 1A and 1B includes a single haptic feedback module 120, in general, the mobile terminal 100 may be have multiple haptic feedback modules. For example, top half of the mobile terminal 100 may have a first haptic feedback module and the bottom half of the mobile terminal 100 may have a second haptic feedback module. As another example, the rear side of the mobile terminal 100 may be a first haptic feedback module and the side surfaces of the mobile terminal 100 may have a second haptic feedback module. Implementations of multiple haptic feedback module may increase the types of haptic response that can be generated, which may improve user experience of the mobile terminal 100.

Referring back to FIG. 1B, the coating layer 126 is supported by the haptic response layer 122. The coating layer 126 may serve various purposes such as protecting the haptic response layer 122 from damage, visually obscuring the haptic response layer 122, and providing a consistent exterior finish across the rear surface of the mobile terminal 100. The coating layer 126 may be formed from various materials such as metal, glass, anodized aluminum, rubber, and resin. The coating layer 126 may be designed to emulate various materials (e.g., metal, rubber, plastic, wood), appearances (e.g., metallic, matte), and textures (e.g., smooth, grainy, rubbery).

The coating layer 126 may have various thicknesses depending on various design considerations such as material of the coating layer 126 and desired coating durability. For example, the thickness of the coating layer 126 can range from 10 μm to 500 μm. Thickness of the coating layer 126 may affect the transfer efficiency of the haptic response generated by the haptic response layer 122 to the hand of the user. As such, it may be beneficial to minimize the thickness of the coating layer 126 while maintaining desired durability and appearance.

The coating layer 126 may be coupled to the haptic response layer 122 in various ways. In some implementations, the coating layer 126 is attached to the haptic response layer 122 by molecular adhesion. Molecular adhesion refers to binding of the material of the coating layer 126 to the material of the haptic response layer 122 through molecular bonding. For example, molecular bonds may be formed by a chemical reaction or physical mixing of the materials at the interface between the haptic response layer 122 and the coating layer 126. Adhesion of the coating layer 126 to the haptic response layer 122 at the molecular level enhances the durability of the coating 126, which may improve the resistance of the coating layer 126 to scratches and scraping and the ability of the coating layer 126 to protect the haptic response layer 122 from physical damage. Further, adhesion of the coating layer 126 to the haptic response layer 122 at the molecular level may enhance a transfer efficiency of the haptic response to the user.

The coating layer 126 may be realized in various ways. In some implementations, the coating layer 126 is deposited onto the haptic response layer 122 through various techniques. Examples of deposition techniques include physical vapor deposition, chemical vapor deposition, powder coating, resin finishing, electroplating, and electroless plating. In some implementations, the coating layer 126 may be a laminate layer that is laminated onto the haptic response layer 122.

While the coating layer 126 is included in the mobile terminal 100 as shown in FIG. 1B, in general, the coating layer 126 may be omitted. For example, a transparent haptic response layer 122 may be used such that the appearance of the rear panel 116 is visible through the haptic response layer.

While the coating layer 126 is shown to be a part of the haptic feedback module 120 in FIG. 1B, in general, the coating layer 126 may be a component of the device housing 110, and may extend across the entire surface of the rear panel 116 to provide a consistent appearance and texture across the rear surface of the mobile terminal 100.

The haptic feedback module 120 can be attached to the device housing 110 in various ways. In some implementations, the adhesive layer 124 is first applied onto the rear panel 116. Once the adhesive layer 124 is applied onto the rear panel 116, the rear panel 116 is processed in an autoclave, which may apply heat and/or pressure to remove any bubbles between the adhesive layer 124 and the rear panel 116 and to improve the adhesion between the two. The haptic response layer 122 is attached to the adhesive layer 124. In some implementations, the adhesive layer 124 may be a pressure sensitive adhesive (PSA), and the haptic response layer 122 may be attached to the adhesive layer 124 by application of a preset pressure. The coating layer 126 is then applied to the haptic response layer 122, completing the attachment of the haptic feedback module 120 to the device housing 110.

While the implementation of the mobile terminal 100 shown in FIG. 1B includes the adhesive layer 124, in general, the haptic response layer 122 may be directly attached to the rear panel 116 without the intervening adhesive layer 124. In some implementations, the haptic response layer 122 may be directly formed on the rear panel 116. For example, the first electrode layer 210 may be deposited and patterned onto the rear panel 116, followed by deposition of the piezoelectric material layer 220, followed by deposition and patterning of the second electrode layer 230 onto the piezoelectric material layer 220.

While the implementation of the haptic feedback module 120 shown in FIG. 1B includes the adhesive layer 124, the coating layer 126 and the haptic response layer 122 arranged between the layers 124 and 126, in general the haptic feedback module 120 may include additional layers that are arranged in between the layers 122, 124 and 126.

Figure 3:
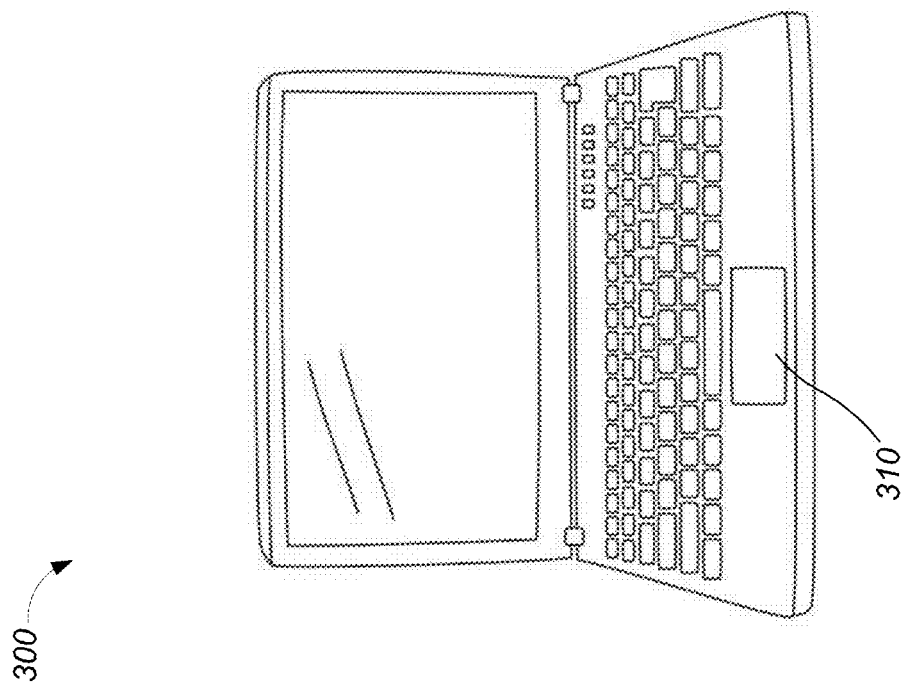
FIG. 3 shows a laptop computer having an exterior piezoelectric haptic feedback module.

Referring to FIG. 3, an exemplary laptop computer 300 having an exterior piezoelectric haptic feedback module is shown. The laptop computer 300 includes a haptic feedback trackpad 310. The haptic feedback trackpad 310 includes a touch-sensitive layer configured to receive touch-input, a haptic feedback module similar to the haptic feedback module 120 shown in FIG. 1B, and an electronic control module similar to the electronic control module 152 shown in FIG. 1C. The haptic feedback module of the trackpad 310 is arranged on an exterior surface of the trackpad 310 that interfaces with a user of the laptop computer 300. The haptic feedback trackpad 310 is a touch-input device configured to receive touch-input from the user of the laptop computer 300 and provide a haptic response. The haptic response may be generated in response to touch-input by the user, for example, to emulate the tactile response from clicking of a mechanical mouse button. In some implementations, the touch-sensitive layer and the haptic feedback module may be integrated into a single module. For example, the piezoelectric material layer 220 may be used for both sensing of the touch-input and generation of haptic response.

Figure 4:
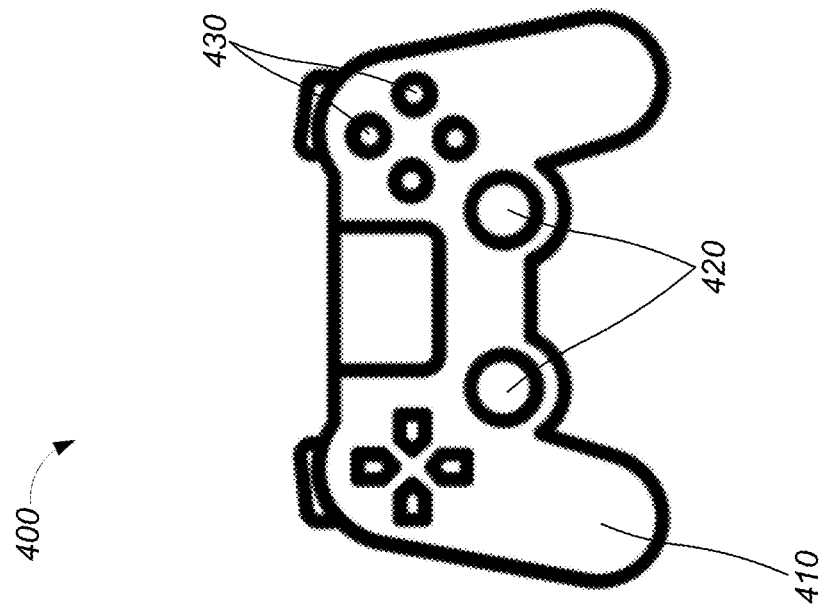
FIG. 4 shows a user input device having an exterior piezoelectric haptic feedback module.

Referring to FIG. 4, an exemplary user input device 400 having an exterior piezoelectric haptic feedback module is shown. The user input device 400 includes a haptic feedback module 410, directional input sticks 420, buttons 430, and an electronic control module similar to the electronic control module 152 shown in FIG. 1C. The haptic feedback module 410 is similar to the haptic feedback module 120 shown in FIGS. 1A-1B, and is arranged over an external surface of the user input device 400. The external surface may be curved, and the haptic feedback module 410 may conform to the contour of the external surface. The directional input sticks 420 are configured to receive directional inputs from a user of the device 400. The buttons 430 are configured to receive inputs from the user. The user input device 400 is a device configured to provide a haptic response to the user. The user input device 400, for example, may be used, for example, as a virtual reality input device, a gaming input device, or a drone control device.

Some aspects of a device containing the piezoelectric haptic feedback module described here can be implemented in digital electronic circuitry, or in computer software, firmware, or hardware, including the structures disclosed in this specification and their structural equivalents, or in combinations of one or more of them. For example, in some implementations, the electronic control module 152 can be implemented using digital electronic circuitry, or in computer software, firmware, or hardware, or in combinations of one or more of them.

The term "electronic control module" encompasses all kinds of apparatus, devices, and machines for processing data and/or control signal generation, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes described above can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

A number of embodiments have been described. Nevertheless, it will be understood that various modifications may be made without departing from the spirit and scope of the invention. Accordingly, other embodiments are within the scope of the claims.

What is claimed is:
1. A device comprising:
a device housing defining a space for accommodating one or more electronic components, the device housing comprising:
a first panel bounding the space and having an exterior surface facing away from the space, and a second panel bounding the space and including a touch-sensitive display having a display surface facing away from the space, the display surface and the exterior surface being different surfaces;

a haptic feedback module supported by and conforming to at least a portion of the exterior surface, the haptic feedback module comprising a haptic response layer, the haptic response layer comprising a piezoelectric material and electrodes and configured to couple vibrations to a user body member in contact with the haptic feedback module to provide a haptic response to the user during operation of the device; and an electronic control module accommodated in the space and coupled to the electrodes of the haptic response layer, the electronic control module being programmed to receive a touch input signal from the touch-sensitive display and provide haptic signals to the electrodes based on the received touch input signal to activate the piezoelectric material of the haptic response layer.

2. The device of claim 1, wherein the haptic feedback module extends over a first area of the exterior surface, the first area of the exterior surface being greater than 50% of a total area of the exterior surface.

3. The device of claim 1, wherein the haptic feedback module comprises a first interior opening.

4. The device of claim 1, wherein the haptic response layer has a thickness less than 500 μm.

5. The device of claim 1, wherein the piezoelectric material comprises a piezoelectric polymer.

6. The device of claim 1, wherein the haptic feedback module is configured to generate a first localized haptic response on a first portion of the haptic feedback module and a second localized haptic response on a second portion of the haptic feedback module different from the first portion.

7. The device of claim 1, the haptic feedback module further comprising an adhesive layer arranged between the exterior surface of the first panel and the haptic response layer and configured to adhere the haptic response layer to the exterior surface.

8. The device of claim 7, wherein the adhesive layer is adjacent to both the exterior surface of the first panel and the haptic response layer.

9. The device of claim 7, wherein the exterior surface and the haptic response layer are bonded to the adhesive layer through an autoclave process.

10. The device of claim 1, the haptic feedback module further comprising a coating layer supported by the haptic response layer.

11. The device of claim 10, wherein the coating layer is adhered to the haptic response layer by molecular adhesion.

12. The device of claim 10, wherein the coating layer is configured to visually obscure the haptic response layer.

13. The device of claim 10, wherein the coating layer is configured to provide a first texture different from a second texture of the haptic response layer.

14. The device of claim 1, wherein the first panel comprises a glass material.

15. The device of claim 1, wherein the first panel comprises a touch-sensitive layer configured to receive a touch input from the exterior surface and generate a touch input signal, and wherein the electronic control module is further programmed to receive the touch input signal from the touch-sensitive layer and to provide the haptic signals to the electrodes based on the received touch input signal.

16. The device of claim 1, wherein the exterior surface is a curved surface.

17. The device of claim 16, wherein the device further comprises:

one or more buttons; and one or more directional input sticks configured to receive directional input from the user.

\* \* \* \* \*

UNITED STATES PATENT AND TRADEMARK OFFICE
CERTIFICATE OF CORRECTION

PATENT NO. : 10,996,755 B2  
APPLICATION NO. : 15/908611  
DATED : May 4, 2021  
INVENTOR(S) : Rivas Constante It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 23 days.

Signed and Sealed this  
Eleventh Day of October, 2022

Katherine Kelly Vidal  
*Director of the United States Patent and Trademark Office*